June 14, 1960   W. L. MORRISON   2,940,268
APPARATUS FOR TRANSPORTING, STORING AND USING NATURAL GAS
Filed May 10, 1954   2 Sheets-Sheet 1

INVENTOR,
Willard L. Morrison
BY Parker & Carter
ATTORNEYS

June 14, 1960  W. L. MORRISON  2,940,268
APPARATUS FOR TRANSPORTING, STORING AND USING NATURAL GAS
Filed May 10, 1954  2 Sheets-Sheet 2

INVENTOR,
Willard L. Morrison
BY Parker & Carter
ATTORNEYS

United States Patent Office 2,940,268
Patented June 14, 1960

2,940,268

APPARATUS FOR TRANSPORTING, STORING AND USING NATURAL GAS

Willard L. Morrison, Lake Forest, Ill., assignor, by mesne assignments, to Constock Liquid Methane Corporation, a corporation of Delaware Filed May 10, 1954, Ser. No. 428,526

4 Claims. (Cl. 62—7)

My invention relates to improvement in method and apparatus for transporting, storing and using natural gas.

I propose to liquefy natural gas, in a barge mounted liquefaction plant, at or near a gas well or wells in a gas field, discharge the liquefied gas into tanks containing interior insulation of balsa wood or other suitable material, which will both insulate the outer metallic tank shell from and will limit heat flow toward and vaporization of the liquefied gas. The gas in the tanks will be at very low temperature, e.g., −258° F. for methane, the principal constituent of natural gas. The tanks will be contained in water borne vessels which can be towed or propelled by dual fuel, natural gas powered engines.

The gas vaporized by the small amount of heat reaching the liquefied mass thru the insulation, the tank walls being at ambient temperature, will furnish the fuel necessary to propel the vessels to destination. Such gas may be warmed en route, by heat transfer from cold storage rooms carried by the vessels, to a temperature suitable for admission to the engines.

At destination, the large amount of heat necessary to vaporize, the gas for use for industrial or other fuel purposes may be provided by heat exchange from cold storage chambers or from other devices which require cold.

My invention is illustrated more or less diagrammatically in the accompanying drawings, wherein.

Like parts are illustrated by like figures on all the drawings.

Figure 1:
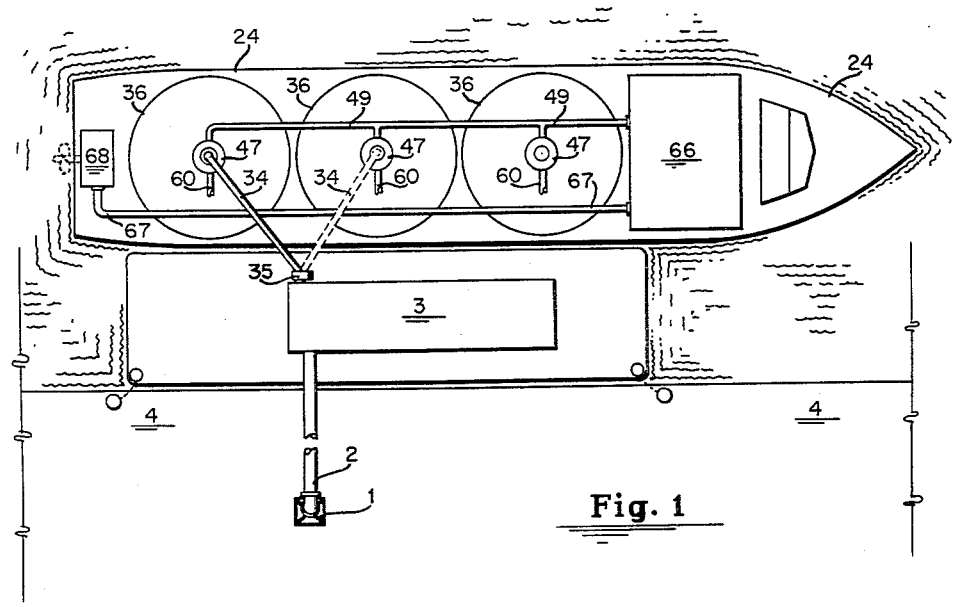
Figure 1 is a plan view of the liquefaction barge and a tank carrying vessel.
Figure 2:
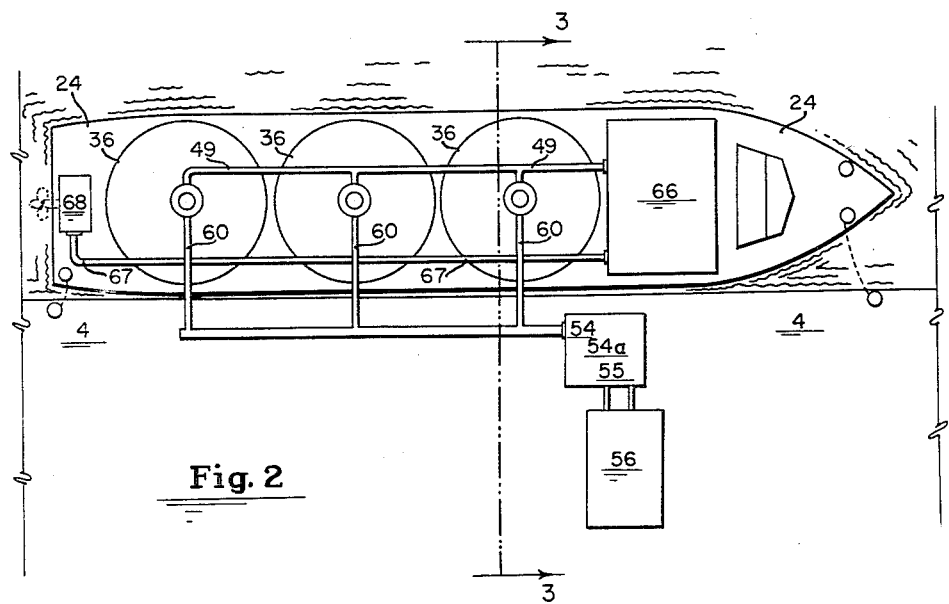
Figure 2 is a plan view of the transport vessel at destination.

1 is a gas well, 2 a pipe conducting gas under pressure from well head to liquefaction barge 3 tied to wharf 4. 5 is a primary heat exchanger, 6 a pressure reducing valve in pipe line 7 leading gas to separator 8. Water and other condensates discharge from separator 8 thru pipe 9. Gas cooled by expansion at 6 passes thru pipe 10 to heat exchanger 5 to cool gas from well on its way to 6. Pipe 11 conducts gas to secondary heat exchanger 12, pipe 13 leads to amine contactor 14. $CO_2$ and other impurities separated out in 14 discharge through 15, pipe 16 leads gas from 14 to drying tower 17 where water is removed and pipe 18 leads back to heat exchanger 12. Pipe 19 leads from 12 to gas turbo expander 20 on shaft 21. Pipe 22 leads exhaust from 20 to separator 23. Liquefied gas passes to storage in vessel 24. Gas not yet liquefied passes from 23 thru pipe 25 to precooler 26. Pipe 27 conducts gas to compressor, intercooler and aftercooler apparatus 28. Pipe 29 conducts gas from 28 to 26 and pipe 30 leads gas back to pipe 19 for recirculation with gas from well thru turbo expander 20.

The power developed by the turbo expander 20 is not sufficient to operate the compressors. The additional power may be provided by steam turbine 31. Fuel to generate steam in boiler 32 to supply turbine 31 is discharged from 28 thru pipe 33, the steam lines not being illustrated.

Suitable temperatures and pressures in the system are illustrated in the following table which refers to the stations lettered on Figure 4:

| Station | A | B | C | D | E | F | G | H | K |
|---|---|---|---|---|---|---|---|---|---|
| P (p.s.i.a.) | 2,500 | 1,050 | 1,000 | 14.7 | 14.7 | 14.7 | 14.7 | 1,000 | 1,000 |
| T (Deg. F) | 80 | 0 | 10 | −259 | −259 | −259 | 73 | 85 | −95 |
| H (B.t.u./lb.) | 333 | 323 | 333 | 186 | 19 | 237 | 407 | 385 | 201 |

The pipe 34 and pump 35 discharge the liquefied gas from separator 23 for storage in tank 36 in vessel 24. Tank 36 has an outer metal shell and is lined throughout with an insulating lining 37 which may be of balsa wood which while it may be penetrated by the liquid is penetrated at such a rate that ambient heat entering through the metal shell vaporizes the liquid before it reaches the metal wall. Thus the shell always may remain at ambient temperature. The gas resulting from such vaporization builds up a pressure in the lining to resist the penetration of the liquid under the impulse of hydrostatic pressure and capillary attraction.

The tank contains a boiler 38 open at bottom as at 39 to the tank 37 below the liquid level 40 and open at top as at 41 to the vapor or gas area above the liquid level. In the lower portion of the boiler 38 is a boiler coil 42 and in the upper portion of the boiler 38 is a superheater coil 43. A partition 44 may be interposed between the two coils, ported at 45. The port 41 may be so designed, or may be controlled by any suitable means not illustrated so that vaporization of the liquefied gas by heat exchange through the coils increases the pressure in the boiler 38 to a point sufficient to overcome in part the hydrostatic head and lower the liquid level in the boiler below the superheater coils prior to such lowering both coils act as boiler coils, thereafter the liquid vaporized by the boiler coil is superheated by the superheater coil.

The superheated vapor passes from the boiler through port 41 to the area in the tank above the level of the liquid, passes out through the valve 46 to the header 47 and is discharged therefrom through the pipes 48 for use as fuel. During travel from the gas field after liquefaction to point of gas delivery and use, the ambient heat entering thru the metal shell and the insulation therein will normally vaporize enough of the gas to furnish the necessary propulsive power and this gas will be discharged from the tank through the line 49.

The boiler and superheater coils are heated by a system through which circulates Freon or any other suitable eutectic which is a liquid at −258° F. Warm eutectic is discharged by pump 50 through line 51 for circulation thru the superheater coil 43. Line 52 leads to boiler coil 42. Line 53 conducts the cold eutectic out to the brine chiller 54 and pipe 55 returns the eutectic warmed in the brine chiller to the pump 50. 54a is a transfer medium or eutectic receiver floating on the line in the usual manner.

56 is a cold storage or cold using chamber or vessel. It contains the usual heat exchange coils or surfaces. Cold brine or other desired eutectic circulates from brine chiller 54 along line 57 to pump 58 to cold chamber 56. Warm brine returns from 56 via line 59 to 54 where it is again cooled. Pipes 51 and 53 are concentric at 60, the outer pipe 51 conducting the warm eutectic enclosing the inner pipe 53 so that the cold eutectic is insulated by the warm stream on its way to the boiler.

Figure 3:
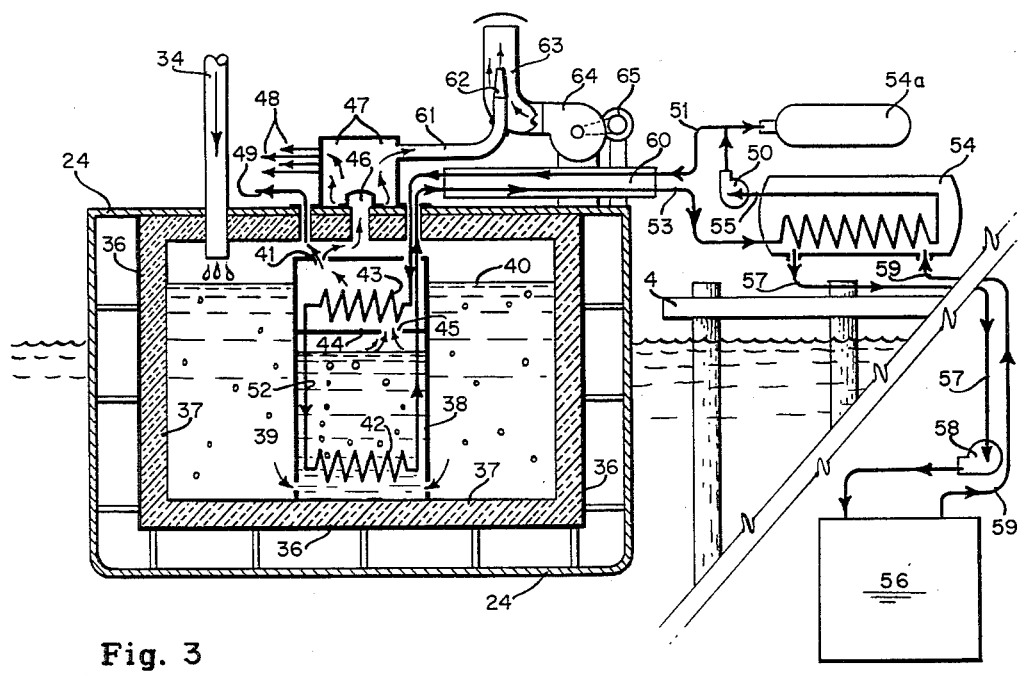
Figure 3 is a section with parts in elevation along line 3—3 of Figure 2.

The rate of heat transfer and the rate of evaporation of the liquefied gas at destination is a matter of design to suit the circumstances and rates of discharge, and refrigeration desired. For example, referring to Figure 3 the brine can well leave the cold chamber 56 at $-20°$ F. after entering it at $-30°$ F. from the brine chiller, the brine temperature in the chiller being above the temperature at which the brine would freeze. The Freon cooled in the tank as it passes through the boiler and superheater coils may be discharged to the brine chiller at about $-240°$ F. will leave the chiller for return to the boiler at say $-40°$ F. and the gas after it has been vaporized by the boiler coil and warmed by the superheater coil will be discharged at $-20°$ F.

Both the eutectic or Freon lines 51, 53 and 60 and the gas lines 48 and 49 will of course be insulated, the details of the insulation itself forming no part of the present invention are in the interest of clarity not illustrated. The temperatures in said lines, however, are such that insulation of standard type may be used.

Since the tank containing the liquefied methane is intended to be maintained at approximately atmospheric pressure, venting means are essential to prevent a build-up of dangerous pressure during times when the tank or tanks are being loaded, transported, and unloaded. 61 is a vent pipe leading from the header 47. It terminates in a discharge nozzle 62 in a venturi 63, 64 is a blower driven by a motor 65 to discharge a blast of air through the venturi 63 so that any gas escaping thru the nozzle 62 will be diluted and mixed with such a volume of air as to be safely discharged to atmosphere. Referring to Figure 1:

66 is a cold storage chamber on the vessel 24. Pipe 49 conducts gas vaporized in tank 36 to chamber 66 where, by any suitable heat exchange means, not specifically illustrated, the gas is warmed as it cools the chamber. The warmed gas then is conducted by pipe 67 to any suitable propulsion means 68.

In order that the tank be constantly purged of oxygen carrying air to prevent formation of an explosive mixture of air and methane in the tank, a supply of Dry Ice or solid carbon dioxide ($CO_2$) is placed in the tank before it is filled with the liquefied gas. The $CO_2$ will evaporate by sublimation because of the ambient heat in the tank and being heavier than air will expel all the air. Then when the liquefied cold gas enters the tank it will freeze the Dry Ice. The Dry Ice will remain in the tank and whenever the liquefied gas is entirely discharged the $CO_2$ will again be vaporized and prevent entrance of air. Under ordinary circumstances the tank will usually be left with sufficient liquefied gas to furnish the fuel necessary for the return trip to point of origin of the gas but the $CO_2$ always remains present and available to prevent entrance of air. As long as the tank remains colder than the ambient temperature evaporation of the liquefied gas or the $CO_2$ will maintain a sufficient pressure in the tank to prevent entrance of air.

Figure 4:
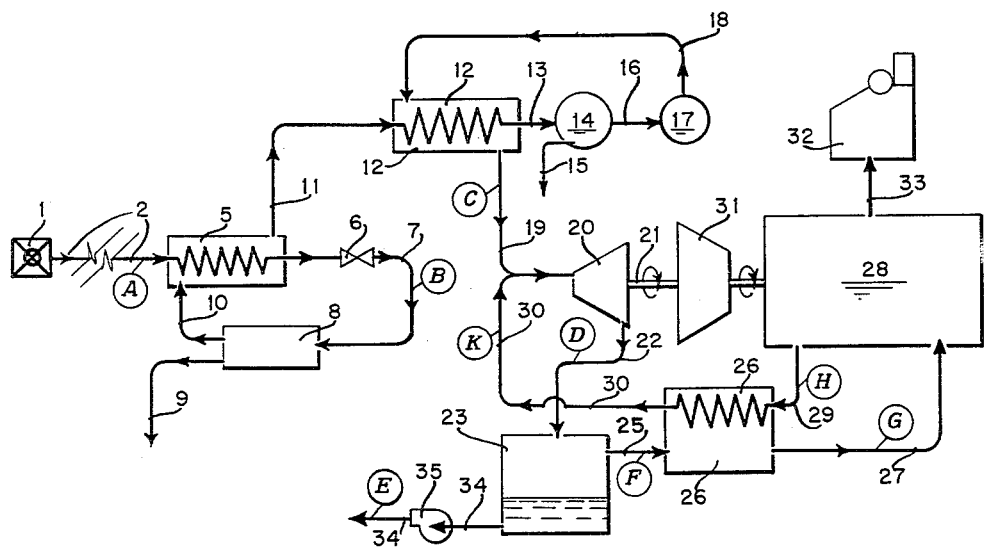
Figure 4 is a diagrammatic showing of the liquefaction mechanism on the liquefaction barge.

Referring to Figure 4 and the description thereof, it will be seen that the warm high pressure gas is expanded and cooled in at least two stages and that before the final expansion stage the cooled gas at intermediate pressure is cleaned of most if not all the condensates and other impurities before liquefaction so that the liquefied gas transported contains a minimum of anything other than methane. I have illustrated two stages of expansion at reducing valve 6 and at turbo expander 20. Thus illustrating two methods of cooling and expansion which are under some circumstances interchangeable. For example, external work might if desired be done at 6 and the power developed might assist in carrying the compressor load.

The steam turbine illustrates any suitable means for providing the added power necessary for the compressors other power means might equally well be used.

Gas vented from the tank can be diluted with some other gas than air or can be flared or burnt in some cases.

The use and operation of my invention are as follows:

Natural gas from a well or wells will be liquefied in a barge-mounted liquefaction plant at the gas field, transferred to balsa-insulated tanks mounted in river barges, and towed upstream by dual fuel, natural-gas-powered towboats. The towboats will be powered by vapors released by the small amount of heat absorbed by the liquid through the insulation en route. At the point of delivery, tremendous quantities of heat are required to vaporize the liquid for use as fuel in an industrial establishment. This heat may be taken from cold storage buildings, thereby supplying many tons of refrigeration.

For example, gas at well or initial pressure, say 2500 p.s.i.a., is initially expanded to about 1000 p.s.i.a., dropping its temperature and removing in separation equipment the heavier hydrocarbons. It then is piped on to an amine contactor and on to a drying tower where $CO_2$, water and other undesirable constituents are removed. The resulting gas, principally methane, is precooled by the gas after it was initially expanded, and is then delivered at plus $10°$ F. to a mixing valve where it joins with other low-temperature gas. The mixture passes through a turbo-expander in which it is expanded to atmospheric pressure and the atmospheric pressure liquefaction temperature of minus $258.6°$ F. An appreciable percentage of the methane will be condensed to liquid, and appreciable power will be developed by the turbo-expander.

For the application under consideration, the uncondensed gas may be compressed to 1000 p.s.i.a. if there is no particular use for this low-pressure gas locally and the cold gas before compression precools the same gas flow after compression to about minus $95°$ F. The precooled gas at 1000 p.s.i.a. is delivered to the mixing valve or to some other expander. All power developed by the turbo-expander is applied to the gas compressors. Its total output, however, is less than the total compression power requirements, and this additional power may be supplied by a steam turbine or other power source connected to a common shaft. Fuel to provide such power can be tapped off at a suitable compression stage. About one-sixth of the total required compression power is supplied by the turbo-expander, the remainder being supplied by the steam turbine.

The barge-mounted liquefaction plant could operate in brackish or sea water as well as fresh water since the steam cycle is closed, and such water can be used for intercooling, after-cooling and steam condensing. Cooling water at approximately $80°$ F., will permit economical interstage and aftercooling to $100°$ F. Aftercoolers will preferably be supplemented by the precooler, as shown in the liquefaction cycle.

Proper insulation is not the only factor involved in the success of this system, but it does make success possible. A very satisfactory method is to apply balsa insulation to the tank interiors. This permits atmospheric storage of liquid methane in metal tanks without subjecting the metal to the very low temperature of the liquid and without appreciable absorption of heat. Since the metal is isolated from the low-temperature gas, it remains at ambient temperature.

The tank barges for the project under discussion may have double hulls and contain five tanks each, with a barge capacity of 35,000 bbl. or more. The space between hulls can be flooded to control the barge draft and constitute an additional safety factor in the event of collisions. Each of the insulated tanks has auxiliary equipment for the controlled evaporation of fuel and the chilling of brine for refrigeration duty. Each tank can also dispose of vapors released in excess of fuel requirements in the event of long layovers en route or at point of delivery. Normally, gas vapor vented in an emergency would be diluted with air to a non-inflammable mixture.

Additional safeguards are required to prevent the occurrence of explosive mixtures in an evacuated tank, and this may be accomplished by the loading of say 1.75 cu. ft. of Dry Ice (solid $CO_2$) for each 1000 cu. ft. of tank volume. Evaporation of all methane will result in increasing temperatures in the tank, and Dry Ice will sublimate into $CO_2$ gas to purge the tank of all other gases. Dry Ice is used in the same manner to purge air from the tanks before putting into service.

Low temperatures within the tanks assure that any flow of heat will be inward, hence a continuous evaporation which assures that all vapor flow will be outward. So long as this prevails, there will be no inward breathing of oxygen-bearing air into the tank. Dry Ice continues this pressurization when and if all methane is expanded. Normally, however, some methane is left in the tanks to fuel the towboat on its return voyage.

In this system, refrigeration and fuel vaporization equipment are synonymous and consist of a methane boiler, methane superheater, and a shell-and-tube type brine chiller. The methane boiler element is located at the bottom of a central boiler column in each storage tank and the superheater is located above it. A suitable low-temperature heat transfer medium (fluid to minus 265 F.) is pumped through the superheater and into the boiler. From the boiler, it returns to the shell-and-tube brine chiller outside the tank. Flow rate of the heat transfer medium is determined by required fuel evaporation. It is conducted from the tank to the brine chilling apparatus through concentric tubing, the warm fluid being in the outside tube to reduce heat absorption from the atmosphere.

In general it may be said that incidental to the transport of liquid methane at atmospheric pressure, there is transported one ton of refrigeration for each 20 MCF of standard gas, available at the transport terminus. Liquid methane as a fuel and refrigerant is both economically and technically practicable when the need for large amounts of refrigeration and fuel are added to inexpensive water transportation, without mentioning the possibility of refrigeration en route. Valves to control discharge of gas through pipes 48 and 49 and check valve to control discharge to nozzle 62 are not illustrated since their details form no part of the present invention.

I claim:

1. Means for liquefying natural gas including a first expansion means for expanding the gas from well pressure and temperature to reduce its pressure and temperature, means for withdrawing from the gas liquids condensed out as a result of such temperature reduction, means for cooling the gas on its way to the first expansion means by heat exchange with the expanded gas, means for subsequently removing additional impurities, a second expansion means for thereafter expanding the gas in admixture with unliquefied gas separated from the effluent of said second expansion means and causing it to do work with resultant further decrease in temperature to a point at which some of the gas is liquefied, means for withdrawing the liquefied gas, means for compressing and cooling the unliquefied gas to a temperature and pressure generally the same as the temperature and pressure of the gas fed from the first expansion means to the second expansion means, means for using the power from the second expansion means to supply some of the power for compression, means for using some of the compressed gas to furnish the additional power necessary for compression, and means for recycling some of the compressed gas for admixture with the cleaned gas prior to advancement to the second expansion means.

2. Means for liquefying natural gas including a first expansion means for expanding the gas from well pressure and temperature to reduce its pressure and temperature, means for withdrawing from the gas liquids condensed out as a result of such temperature reduction, means for cooling the gas on its way to the first expansion means by heat exchange with the expanded gas, means for subsequently removing additional impurities, a second expansion means for thereafter expanding the gas in admixture with unliquefied gas separated from the effluent of said second expansion means and causing it to do work with resultant further decrease in temperature to a point at which some of the gas is liquefied, means for withdrawing the liquefied gas, means for compressing and cooling the unliquefied gas to a temperature and pressure generally the same as the temperature and pressure of the gas fed from the first expansion means to the second expansion means, means for using the power from the second expansion means to supply some of the power for compression, means for using the gas in gaseous phase after removal of the liquefied gas for additionally cooling the compressed gas, and means for recycling some of the compressed gas for admixture with the cleaned gas prior to advancement to the second expansion means.

3. Means for liquefying natural gas including a first expansion means for expanding the gas from well pressure and temperature to reduce its pressure and temperature, means for withdrawing from the gas liquids condensed out as a result of such temperature reduction, means for cooling the gas on its way to the first expansion means by heat exchange with the expanded gas, means for subsequently removing additional impurities, a second expansion means for thereafter expanding the gas in admixture with unliquefied gas separated from the effluent of said second expansion means and causing it to do work with resultant further decrease in temperature to a point at which some of the gas is liquefied, means for withdrawing the liquefied gas, means for compressing and cooling the unliquefied gas to a temperature and pressure generally the same as the temperature and pressure of the gas fed from the first expansion means to the second expansion means, means for using the power from the second expansion means to supply some of the power for compression, means for using some of the compressed gas to furnish the additional power necessary for compression means for using the gas in gaseous phase after removal of the liquefied gas for additionally cooling the compressed gas, and means for recycling some of the compressed gas for admixture with the cleaned gas prior to advancement to the second expansion means.

4. Means for liquefying natural gas including a first expansion means for expanding the raw natural gas at high pressure to reduce its pressure and temperature, means for cleaning by withdrawing from the gas liquids condensed out as a result of such temperature reduction, means for cooling the raw gas on its way to the first expansion means by passing the raw gas in heat-exchange relation with the cooled expanded gas, a second expansion means for thereafter expanding with work the cleaned gas from the first expansion means with resultant decrease in temperature to a point at which some of the gas is liquefied, means for withdrawing the liquefied portion of the expanded gas from the second expansion means, means for recompressing and cooling unliquefied portions of the gas from the second expansion means to a pressure corresponding to the pressure of the cleaned gas from the first expansion means before the second expansion means is reached, means for recycling some of the recompressed unliquefied portion of the gas for joinder with the cleaned gas advanced to the second expansion means, and means for using power from the second expansion means to supply some of the power for compression.

References Cited in the file of this patent

UNITED STATES PATENTS

| | | |
|---|---|---|
| 1,140,250 | Cabot | May 18, 1915 |
| 2,082,189 | Twomey | June 1, 1937 |
| 2,100,474 | Fish | Nov. 30, 1937 |
| 2,214,678 | Raigorodsky | Sept. 10, 1940 |
| 2,217,749 | Hewitt | Oct. 15, 1940 |
| 2,550,886 | Thompson | May 1, 1951 |
| 2,679,145 | Hagen | May 25, 1954 |
| 2,689,462 | Brandon | Sept. 21, 1954 |